United States Patent
Takahashi et al.

(10) Patent No.: US 11,387,487 B2
(45) Date of Patent: Jul. 12, 2022

(54) SULFUR-CONTAINING COMPOUND, SOLID ELECTROLYTE, AND BATTERY

(71) Applicant: Mitsui Mining & Smelting Co., Ltd., Tokyo (JP)

(72) Inventors: Tsukasa Takahashi, Ageo (JP); Takahiro Ito, Ageo (JP); Masaru Hyakutake, Ageo (JP); Teruaki Yagi, Ageo (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 17/291,119

(22) PCT Filed: Nov. 6, 2019

(86) PCT No.: PCT/JP2019/043450
§ 371 (c)(1),
(2) Date: May 4, 2021

(87) PCT Pub. No.: WO2020/095937
PCT Pub. Date: May 14, 2020

(65) Prior Publication Data
US 2022/0006117 A1    Jan. 6, 2022

(30) Foreign Application Priority Data
Nov. 8, 2018 (JP) .............................. JP2018-210467

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/72* (2013.01); *H01M 2300/008* (2013.01)

(58) Field of Classification Search
CPC ........... H01M 10/052; H01M 10/0562; H01M 10/0525; H01M 2220/30; H01M 2300/008; H01M 2300/0068
See application file for complete search history.

(56) References Cited

U.S. PATENT DOCUMENTS

2016/0156064 A1    6/2016   Miyashita et al.
2016/0164136 A1    6/2016   Higuchi et al.
(Continued)

FOREIGN PATENT DOCUMENTS

EP          3018660 A1    5/2016
JP       2013137889 A    7/2013
(Continued)

OTHER PUBLICATIONS

Rayavarapu et al., "Variation in Structure and Li+-ion Migration in Argyrodite-Type Li6PS5X (X=Cl, Br, I) Solid Electrolytes", J. Solid State Electrochem, 2012, pp. 1807-1813, vol. 16.
(Continued)

*Primary Examiner* — Sarah A. Slifka
*Assistant Examiner* — Rachel L Zhang
(74) *Attorney, Agent, or Firm* — The Webb Law Firm

(57) ABSTRACT

A sulfur-containing compound containing a lithium (Li) element, a phosphorus (P) element, a sulfur (S) element, and a halogen (X) element, which can be suitably used as a solid electrolyte, and is able to suppress the generation of a hydrogen sulfide gas even when exposed to moisture in the atmosphere. The sulfur-containing compound has a peak at each position of $2\theta=21.3°\pm1.0°$, $27.8°\pm1.0°$, and $30.8°\pm0.5°$ in an X-ray diffraction pattern measured by an X-ray diffraction apparatus (XRD) using CuKα1 rays.

13 Claims, 2 Drawing Sheets

(56) References Cited

U.S. PATENT DOCUMENTS

| | | |
|---|---|---|
| 2016/0248119 A1 | 8/2016 | Kato |
| 2017/0149086 A1 | 5/2017 | Du et al. |
| 2017/0194662 A1 | 7/2017 | Kambara et al. |
| 2017/0222257 A1 | 8/2017 | Miyashita et al. |
| 2017/0352916 A1 | 12/2017 | Miyashita et al. |
| 2018/0287204 A1 | 10/2018 | Kanno et al. |
| 2019/0312304 A1 | 10/2019 | Uesugi et al. |

FOREIGN PATENT DOCUMENTS

| | | |
|---|---|---|
| JP | 201624874 A | 2/2016 |
| JP | 2016157630 A | 9/2016 |
| JP | 201849834 A | 3/2018 |
| JP | 201867552 A | 4/2018 |
| WO | 2015001818 A1 | 1/2015 |
| WO | 2015012042 A1 | 1/2015 |
| WO | 2016104702 A1 | 6/2016 |
| WO | 2017091341 A1 | 6/2017 |
| WO | 2018003333 A1 | 1/2018 |

OTHER PUBLICATIONS

Sedlmaier et al., "Li4PS4I: A Li+ Superionic Conductor Synthesized by a Solvent-Based Soft Chemistry Approach", Chemistry of Materials, 2017, pp. 1830-1835, vol. 29.

Sedlmaier et al., "Supporting Information: Li4PS4I: A Li+ Superionic Conductor Synthesized by a Solvent-Based Soft Chemistry Approach", Chemistry of Materials, 2017, 12 pages, vol. 29.

[FIG. 1]
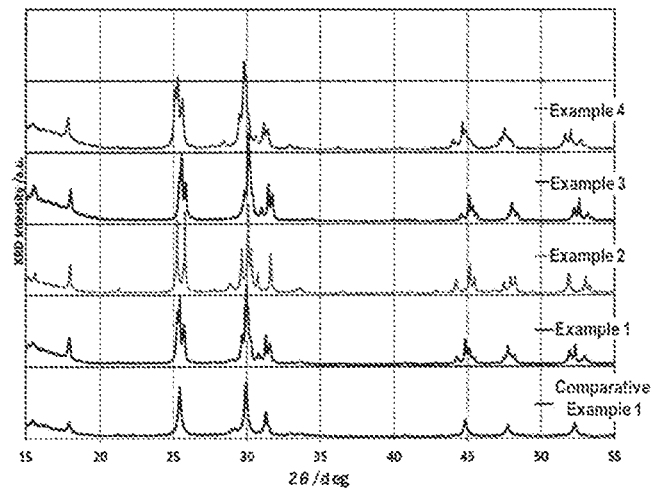
[FIG. 2]
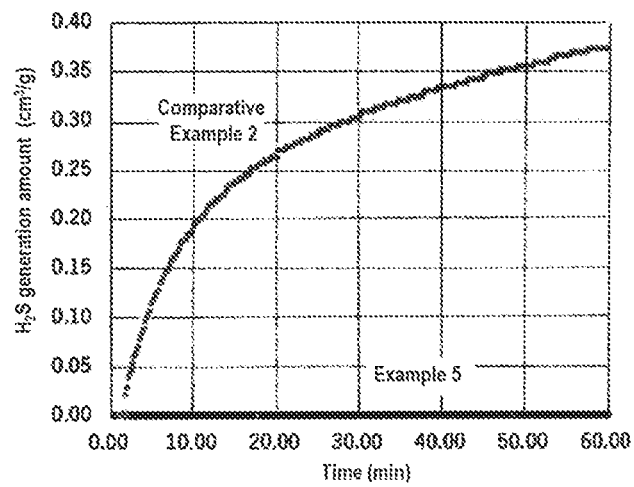
[FIG. 3]
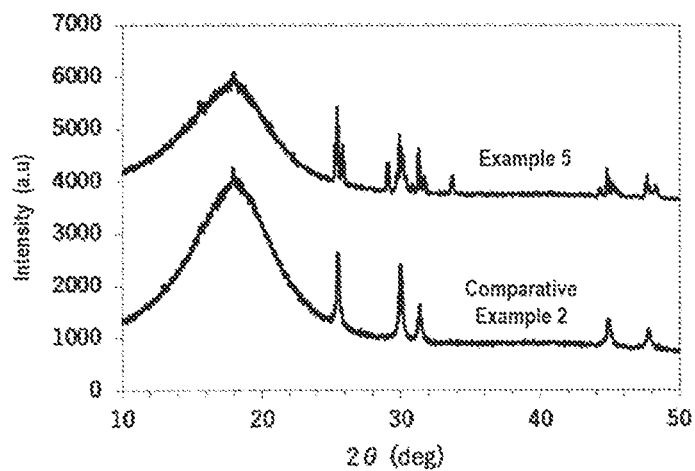

[FIG. 4]
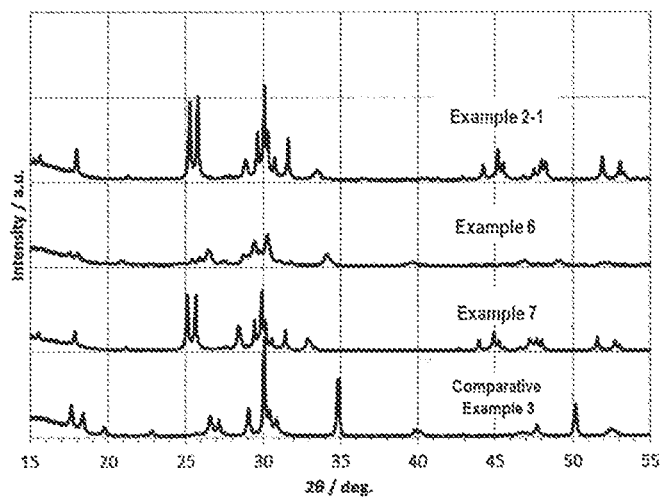
[FIG. 5]
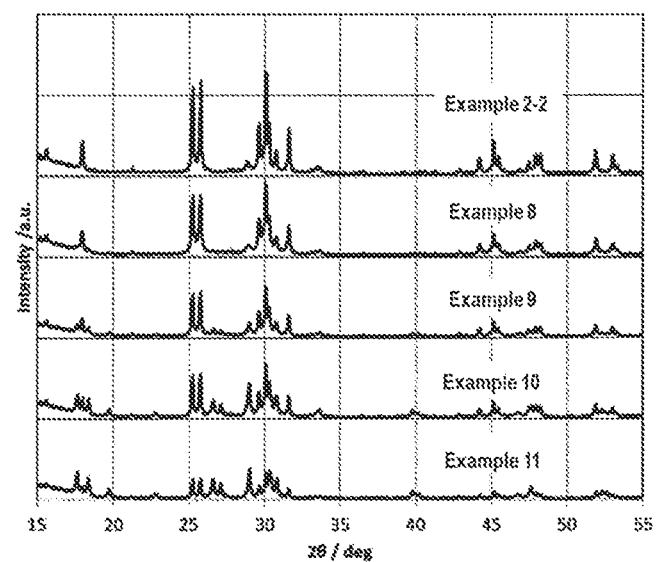

SULFUR-CONTAINING COMPOUND, SOLID ELECTROLYTE, AND BATTERY

CROSS-REFERENCE TO RELATED APPLICATIONS

This application is the United States national phase of International Application No. PCT/JP2019/043450 filed Nov. 6, 2019, and claims priority to Japanese Patent Application No. 2018-210467 filed Nov. 8, 2018, the disclosures of which are hereby incorporated by reference in their entirety.

TECHNICAL FIELD

The present disclosure relates to a sulfur-containing compound that can be suitably used as, for example, a solid electrolyte.

BACKGROUND ART

An all-solid battery does not require a flammable organic solvent. Therefore, simplification of safety devices can be attempted, and the battery can be excellent in terms of production cost and productivity. Also, the battery has a feature that solid electrolytes can be laminated in series in a cell, to achieve high voltage. Further, in a solid electrolyte used for the all-solid battery, since nothing but lithium ions moves and side reactions caused by movement of anions do not occur, it is expected that this leads to improvement of safety and durability.

As a substance used for the solid electrolyte of the all-solid battery, a solid electrolyte composed of a sulfur-containing compound containing a lithium (Li) element, a phosphorus (P) element, and a sulfur (S) element, is attracting attention.

For example, Japanese Patent Laid-Open No. JP 2013-137889 (Patent Document 1) discloses a sulfide solid electrolyte having a framework structure of $Li_7PS_6$ and a compositional formula: $Li_{7+x}P_{1-y}Si_yS_6$ (wherein x is −0.6 to 0.6 and y is 0.1 to 0.6) in which a part of P is substituted by Si.

International Publication No. WO 2015/001818 discloses a crystalline solid electrolyte being represented by a compositional formula: $Li_xSi_yP_zS_aHa_w$ (wherein, Ha includes one or two or more of Br, Cl, I, and F, and 2.4<(x−y)/(y+z)<3.3), in which the content of S is 55 to 73% by mass, the content of Si is 2 to 11% by mass, and the content of a Ha element is 0.02% by mass or more.

International Publication No. WO 2015/012042 discloses a sulfide-based solid electrolyte for a lithium ion battery, which contains a compound having a cubic crystal structure belonging to a space group F-43m and being represented by a compositional formula: $Li_{7-x}PS_{6-x}Ha_x$ (Ha is either Cl or Br), in which x in the compositional formula is 0.2 to 1.8, and a value of the lightness L* in the L*a*b* color system is 60.0 or more.

Japanese Patent Laid-Open No. 2016-024874 discloses a sulfide-based solid electrolyte for a lithium ion battery, which contains a compound having a cubic argyrodite-type crystal structure and being represented by a compositional formula (1): $Li_{7-x-2y}PS_{6-x-y}Cl_x$, in which in the compositional formula (1), conditions: 0.8≤x≤1.7 and 0<y≤−0.25x+0.5 are satisfied.

In general, the above-mentioned solid electrolyte composed of the sulfur-containing compound has a high ionic conductivity and at the same time has an extremely high reactivity with moisture and oxygen, and thus may generates a hydrogen sulfide gas when exposed to, for example, moisture in the atmosphere. For this reason, there has been a problem of the need to handle in a limited environment such as a dry room where an inert gas having an extremely low dew point is constantly supplied. Therefore, with regard to the solid electrolyte of this kind, proposals have been made to improve the moisture resistance.

For example, International Publication No. WO 2018/003333 discloses a novel sulfide-based solid electrolyte for a lithium secondary battery capable of suppressing hydrogen sulfide from being generated by reaction with moisture even in contact with dry air in a dry room or the like, and yet capable of securing lithium ionic conductivity, wherein the surface of a compound containing lithium, phosphorus, sulfur, and a halogen, and having a cubic argyrodite-type crystal structure is coated with a compound having a non-argyrodite-type crystal structure and containing lithium, phosphorus, and sulfur.

Japanese Patent Laid-Open No. 2018-067552 discloses a sulfide-based solid electrolyte for a lithium secondary battery capable of suppressing hydrogen sulfide from being generated by reaction with moisture, and capable of securing lithium ionic conductivity, wherein the surface of a compound containing lithium, phosphorus, sulfur, and a halogen, and having a cubic argyrodite-type crystal structure is coated with a compound having a non-argyrodite-type crystal structure and containing lithium, phosphorus, and sulfur; and the compound having a non-argyrodite-type crystal structure is a compound having an orthorhombic or triangular crystal structure.

CITATION LIST

Patent Document

Patent Document 1: Japanese Patent Laid-Open No. 2013-137889
Patent Document 2: International Publication No. WO 2015/001818
Patent Document 3: International Publication No. WO 2015/012042
Patent Document 4: Japanese Patent Laid-Open No. 2016-024874
Patent Document 5: International Publication No. WO 2018/003333
Patent Document 6: Japanese Patent Laid-Open No. 2018-067552

SUMMARY OF THE INVENTION

The present disclosure relates to a sulfur-containing compound containing a lithium (Li) element, a phosphorus (P) element, a sulfur (S) element, and a halogen (X) element, and is to provide a novel sulfur-containing compound, which can be suitably used as, for example, a solid electrolyte, and is able to suppress the generation of a hydrogen sulfide gas even when exposed to moisture in the atmosphere.

The present disclosure proposes a sulfur-containing compound containing a lithium (Li) element, a phosphorus (P) element, a sulfur (S) element, and a halogen (X) element, and having a peak at each position of 2θ=21.3°±1.0°, 27.8°±1.0°, and 30.8°±0.5° in an X-ray diffraction pattern measured by an X-ray diffraction apparatus (XRD) using CuKα1 rays.

The sulfur-containing compound proposed by the present disclosure has peaks belonging to a novel crystal phase. That is, the present sulfur-containing compound has a novel crystal phase. The sulfur-containing compound proposed by the present disclosure can be industrially suitably utilized as a solid electrolyte, and is able to effectively suppress the generation of a hydrogen sulfide gas even when exposed to moisture in the atmosphere compared with conventional solid electrolytes.

BRIEF DESCRIPTION OF DRAWINGS

FIG. 1 is a graph showing an X-ray diffraction pattern obtained by measuring the sulfur-containing compound (sample) in each of Examples 1, 2, 3, 4, and Comparative Example 1 by an X-ray diffraction method.

FIG. 2 is a graph showing the results of measuring the amount of hydrogen sulfide generated from the sulfur-containing compound (sample) in each of Example 5 and Comparative Example 2.

FIG. 3 is a graph showing an X-ray diffraction pattern obtained by measuring the sulfur-containing compound (sample) in each of Examples 5 and Comparative Example 2 by the X-ray diffraction method.

FIG. 4 is a graph showing an X-ray diffraction pattern obtained by measuring the sulfur-containing compound (sample) in each of Examples 2-1, 6, 7, and Comparative Example 3 by the X-ray diffraction method.

FIG. 5 is a graph showing an X-ray diffraction pattern obtained by measuring the sulfur-containing compound (sample) in each of Examples 2-2, 8, 9, 10, and 11 by the X-ray diffraction method.

DESCRIPTION OF THE INVENTION

Next, the present disclosure will be described based on exemplary embodiments. However, the present disclosure is not limited to the embodiments that will be described below.

<Present Sulfur-Containing Compound>

The sulfur-containing compound according to an example of the embodiment of the present disclosure (referred to as "present sulfur-containing compound") is a crystalline compound containing a lithium (Li) element, a phosphorus (P) element, a sulfur (S) element, and a halogen (X) element.

<Crystal Structure>

The present sulfur-containing compound is characterized by having a peak at each position of $2\theta=21.3°\pm1.0°$, $27.8°\pm1.0°$, and $30.8°\pm0.5°$ in an X-ray diffraction pattern measured by an X-ray diffraction apparatus (XRD) using CuKα1 rays. These peaks are peaks belonging to a novel crystal phase in the present disclosure.

The novel crystal phase having the above peaks is a normal trigonal crystal phase or a hexagonal crystal phase. The present sulfur-containing compound having such a crystal phase is able to effectively suppress the generation of a hydrogen sulfide gas even when exposed to moisture in the atmosphere, and can be suitably utilized as a solid electrolyte as described below.

Hereinafter, the peak at the position of $2\theta=21.3°\pm1.0°$ may be referred to as a peak A, the peak at the position of $2\theta=27.8°\pm1.0°$ may be referred to as a peak B, and the peak at the position of $2\theta=30.8°\pm0.5°$ may be referred to as a peak C.

Here, the term "peak" in the present specification mainly means the apex of the peak.

The peak A present at $2\theta=21.3°\pm1.0°$ may be present at, for example, $2\theta=21.3°\pm0.7°$, may be present at $2\theta=21.3°\pm0.5°$, and may be present at $2\theta=21.3°\pm0.3°$.

The peak B present at $2\theta=27.8°\pm1.0°$ may be present at, for example, $2\theta=27.8°\pm0.7°$, may be present at $2\theta=27.8°\pm0.5°$, and may be present at $2\theta=27.8°\pm0.3°$.

The peak C present at $2\theta=30.8°\pm0.5°$ may be present at, for example, $2\theta=30.8°\pm0.3°$, may be present at $2\theta=30.8°\pm0.2°$, and may be present at $2\theta=30.8°\pm0.1°$.

The peak A is a peak of the (103) plane or the (013) plane, the peak B is a peak of the (112) plane or the (11-2) plane, and the peak C is a peak of the (006) plane.

It is preferable that the peak A, the peak B, and the peak C are respectively independently present without being overlapped with other peaks.

The present sulfur-containing compound may further have at least two peaks in a range of $2\theta=25.0°$ or more and $26.0°$ or less in addition to the above peaks, in the X-ray diffraction pattern. That is, the present sulfur-containing compound may have a peak D and a peak E in the range of $2\theta=25.0°$ or more and $26.0°$ or less in the X-ray diffraction pattern.

Here, the peak D refers to a peak located at the lowest angle side in the range of $2\theta=25.0°$ or more and $26.0°$ or less, and the peak E refers to a peak located at the highest angle side in the range of $2\theta=25.0°$ or more and $26.0°$ or less.

The peak D and the peak E are respectively independently present without being overlapped each other.

Further, both the peak D and the peak E are peaks belonging to the novel crystal phase in the present disclosure.

The peak D may be a peak located at $2\theta=25.2°\pm0.5°$, may be a peak located at $2\theta=25.2°\pm0.3°$, and may be a peak located at $2\theta=25.2°\pm0.1°$.

The peak E may be a peak located at $2\theta=25.8°\pm0.5°$, may be a peak located at $2\theta=25.8°\pm0.3°$, and may be a peak located at $2\theta=25.8°\pm0.1°$.

However, in the above-mentioned positions of the peak D and the peak E, the range on the lower angle side than $2\theta=25.0°$ and the range on the higher angle side than $2\theta=26.0°$ are not included.

The peak D is a peak of the (014) plane or the (104) plane, and the peak E is a peak of the (110) plane. It is preferable that the peak D and the peak E are respectively independently present without being overlapped with other peaks.

In the case where the present sulfur-containing compound has the peak D and the peak E in the range of $2\theta=25.0°$ or more and $26.0°$ or less, it may have a peak F between the peak D and the peak E.

The peak F is a peak belonging to a crystal phase having an argyrodite-type structure.

The peak F is located between the peak D and the peak E, and may be located at, for example, $2\theta=25.4°\pm0.5°$, may be located at $2\theta=25.4°\pm0.3°$, may be located at $2\theta=25.4°\pm0.2°$, and may be located at $2\theta=25.4°\pm0.1°$.

Normally, the peak F is independently present without being overlapped with the peak D and the peak E.

Moreover, the present sulfur-containing compound may have at least three peaks in a range of $2\theta=30.0°$ or more and $31.0°$ or less in addition to the above peaks, in the X-ray diffraction pattern. That is, the present sulfur-containing compound may have a peak G, a peak H, and a peak I in the range of $2\theta=30.0°$ or more and $31.0°$ or less in the X-ray diffraction pattern.

Here, the peak G refers to a peak located at the lowest angle side in the range of $2\theta=30.0°$ or more and $31.0°$ or less, the peak I refers to a peak located at the highest angle side in the range of 2θ=30.0° or more and 31.0° or less, and the peak H is a peak located between the peak G and the peak I.

The peak G, the peak H, and the peak I are respectively independently present without being overlapped each other. Further, the peak G, the peak H, and the peak I are all peaks belonging to the novel crystal phase in the present disclosure.

The peak G may be a peak located at 2θ=30.0°±0.5°, may be a peak located at 2θ=30.0°±0.3°, and may be a peak located at 2θ=30.0°±0.1°.

The peak H may be a peak located at 2θ=30.2°±0.5°, may be a peak located at 2θ=30.2°±0.3°, and may be a peak located at 2θ=30.2°±0.1°.

The peak I may be a peak located at 2θ=30.8°±0.5°, may be a peak located at 2θ=30.8°±0.3°, and may be a peak located at 2θ=30.8°±0.1°. That is, the peak I is equal to the peak C described above.

However, in the above-mentioned positions of the peak G, the peak H, and the peak I, the range on the lower angle side than 2θ=30.0° and the range on the higher angle side than 2θ=31.0° are not included.

The peak G is a peak of the (113) plane or the (11-3) plane, the peak H is a peak of the (021) plane or the (201) plane, and the peak I is a peak of the (006) plane.

It is preferable that the peak G, the peak H, and the peak I are respectively independently present without being overlapped with other peaks.

The present sulfur-containing compound may have other peaks at positions other than the above-mentioned peaks in the X-ray diffraction pattern.

Examples of the "other peaks" may include peaks located at 2θ=31.5°±0.5°, 33.5°±0.5°. The peaks may also be located at, for example, 2θ=31.5°±0.3°, 33.5°±0.3°.

It is preferable that the other peaks described above are respectively independently present without being overlapped with other peaks.

In the X-ray diffraction pattern, whether or not a peak is present in each region can be determined as follows.

For example, the presence or absence of a peak in a region of 2θ=21.3°±1.0°, can be determined by whether or not to have a ratio (B/A) of 1.01 or more, preferably 1.05 or more, and more preferably 1.10 or more, when the average value of the X-ray intensities (counts) at 2θ=(21.3°−1.0°)±0.5°, that is, 2θ=20.3°±0.5° and 2θ=(21.3°+1.0°)±0.5°, that is, 2θ=22.3°±0.5° is defined as intensity A of the background (BG) and the maximum value of the X-ray intensity (counts) at 2θ=21.3°±1.0° is defined as peak intensity B in the X-ray diffraction pattern. The same applies to the case where it is determined whether or not other peaks are present in predetermined regions.

Here, the X-ray intensity is a value measured by the apparatus and conditions used in Examples described below.

All of the peaks characterizing the sulfur-containing compound in the X-ray diffraction pattern measured by the X-ray diffraction apparatus (XRD) using CuKα1 rays are peaks belonging to the novel crystal phase that has not been conventionally known. The present sulfur-containing compound may be a compound composed of a single phase of the novel crystal phase in the present disclosure, and may be a compound having another crystal phase (different phase) different from the above crystal phase.

When the present sulfur-containing compound is fitted to a crystal structure model of a space group P31 or a space group P62 in the X-ray diffraction pattern measured by the X-ray diffraction apparatus (XRD) using CuKα1 rays, Rwp (%) and S, which represent the degree of coincidence of an observed intensity with a calculated intensity, are preferably Rwp<10% or S<2.5.

At this time, when Rwp and S are Rwp<10% or S<2.5, it can be said that the observed intensity and the calculated intensity are sufficiently coincident. From such a viewpoint, Rwp is more preferably less than 8%, and even more preferably less than 6%; and S is more preferably more than 1.0 and less than 2.3, and even more preferably less than 2.1.

The present sulfur-containing compound may have the above-mentioned predetermined peaks. The present sulfur-containing compound can be obtained, for example, by changing the composition of the sulfur-containing compound or the conditions of the calcination step in the production, as described below.

(Composition)

Examples of the halogen (X) element contained in the present sulfur-containing compound may include a fluorine (F) element, a chlorine (Cl) element, a bromine (Br) element, and an iodine (I) element; and the halogen (X) element may be one or a combination of two or more elements of these. From the viewpoint of effectively suppressing the generation of a hydrogen sulfide gas, the halogen (X) element is preferably selected from a chlorine (Cl) element and a bromine (Br) element.

As a preferred example of the present sulfur-containing compound, a compound represented by a general formula (1): $Li_aPS_bX_c$ (X is at least one of F, Cl, Br, and I, a is in a range of 3.0 or more and 6.0 or less, b is in a range of 3.5 or more and 4.8 or less, and c is in a range of 0.1 or more and 3.0 or less) can be cited.

In the general formula (1), a representing the molar ratio of the lithium (Li) element is, for example, in a range of 3.0 or more and 6.0 or less, and may be in a range of 3.2 or more or 5.8 or less, or in a range of 3.4 or more or 5.4 or less. In addition, a may be less than 5.4.

In the general formula (1), b representing the molar ratio of the sulfur (S) element is, for example, in a range of 3.5 or more and 4.8 or less, and may be in a range of 3.8 or more or 4.6 or less, or in a range of 4.0 or more or 4.4 or less. In addition, b may be less than 4.4.

In the general formula (1), c representing the molar ratio of the halogen (X) element is, for example, in a range of 0.1 or more and 3.0 or less, and may be in a range of 0.2 or more or 2.5 or less, or in a range of 0.4 or more or 2.0 or less.

The present sulfur-containing compound may contain an element other than the lithium (Li) element, the phosphorus (P) element, the sulfur (S) element, and the halogen (X) element. For example, there is a possibility that a part of the lithium (Li) element may be replaced with another alkali metal element, a part of the phosphorus (P) element may be replaced with another pnictogen element, and a part of the sulfur (S) element may be replaced with another chalcogen element.

As described above, the present sulfur-containing compound may contain, for example, unavoidable impurities in addition to the lithium (Li) element, the phosphorus (P) element, the sulfur (S) element, and the halogen (X) element.

The content of the unavoidable impurities in the present sulfur-containing compound can be, for example, less than 5 mol %, preferably less than 3 mol %, and more preferably less than 1 mol % from the viewpoint of reducing the influence on the performance.

The present sulfur-containing compound is a crystalline material containing the novel crystal phase. The present sulfur-containing compound may contain the novel crystal phase in the present disclosure, and may also contain other materials or other crystal phases such as a glass component.

Here, "the present sulfur-containing compound contains the novel crystal phase in the present disclosure" means that the present sulfur-containing compound contains at least the novel crystal phase in the present disclosure. The content ratio of the novel crystal phase in the present disclosure to the total crystal phase constituting the present sulfur-containing compound may be, for example, 10% by mass or more, may be 20% by mass or more, or may be 50% by mass or more.

In particular, the present sulfur-containing compound preferably contains the novel crystal phase in the present disclosure as a main phase. Here, the term "main phase" refers to a phase having the largest ratio to the total amount of all the crystal phases constituting the present sulfur-containing compound. Therefore, the content ratio of the novel crystal phase in the present disclosure to the total crystal phase constituting the present sulfur-containing compound is preferably, for example, 60% by mass or more, more preferably 70% by mass or more, even more preferably 80% by mass or more, and still more preferably 90% by mass or more. Here, the ratio of the crystal phase can be confirmed by, for example, XRD.

(Applications of Present Sulfur-Containing Compound)

Examples of applications of the present sulfur-containing compound may include a solid electrolyte.

<Method for Producing Present Sulfur-Containing Compound>

Next, an example of the method for producing the present sulfur-containing compound will be described. However, the method for producing the present sulfur-containing compound is not limited to the production method described herein.

The present sulfur-containing compound is preferably produced in such a manner that, for example, predetermined raw materials are mixed to obtain a raw material mixture ("mixing step"), and the obtained raw material mixture is calcined so as to be heated to 500° C. or higher (product temperature) while allowing a hydrogen sulfide gas ($H_2S$) to flow ("calcination step"). However, the method is not limited to such a production method.

It is difficult to prepare the above-mentioned crystal phase unless specific conditions are set with the explicit purpose of preparing the novel crystal phase.

(Raw Materials)

The raw materials are substances containing elements constituting the present sulfur-containing compound, and these are a compound substance containing a lithium (Li) element, a compound substance containing a sulfur (S) element, a compound substance containing a phosphorus (P) element, and a compound substance containing a halogen (X) element.

Examples of the compound substance containing a lithium (Li) element may include lithium compounds such as lithium sulfide ($Li_2S$), lithium oxide ($Li_2O$), and lithium carbonate ($Li_2CO_3$); and a lithium metal single substance.

Examples of the compound substance containing a sulfur (S) element may include phosphorus sulfides such as diphosphorus trisulfide ($P_2S_3$) and diphosphorus pentasulfide ($P_2S_5$). As the compound substance containing a sulfur (S) element, a sulfur (S) single substance can also be used.

Examples of the compound substance containing a phosphorus (P) element may include phosphorus sulfides such as diphosphorus trisulfide ($P_2S_3$) and diphosphorus pentasulfide ($P_2S_5$); a phosphorus compound such as sodium phosphate ($Na_3PO_4$); and a phosphorus single substance.

Examples of the compound substance containing an X (halogen) element may include a compound of one or two or more elements selected from the group consisting of a fluorine (F) element, a chlorine (Cl) element, a bromine (Br) element, and an iodine (I) element, and of one or two or more elements selected from the group consisting of a sodium (Na) element, a lithium (Li) element, a boron (B) element, an aluminum (Al) element, a silicon (Si) element, a phosphorus (P) element, a sulfur (S) element, a germanium (Ge) element, an arsenic (As) element, a selenium (Se) element, a tin (Sn) element, an antimony (Sb) element, a tellurium (Te) element, a lead (Pb) element, and a bismuth (Bi) element; and a compound in which oxygen or sulfur is further bonded to the above compound. Specific examples thereof may include lithium halides such as LiF, LiCl, LiBr, and LiI; phosphorus halides such as $PF_3$, $PF_5$, $PCl_3$, $PCl_5$, $POCl_3$, $PBr_3$, $POBr_3$, $PI_3$, $P_2Cl_4$, and $P_2I_4$; sulfur halides such as $SF_2$, $SF_4$, $SF_6$, $S_2F_{10}$, $SCl_2$, $S_2Cl_2$, and $S_2Br_2$; sodium halides such as NaI, NaF, NaCl, and NaBr; and boron halides such as $BCl_3$, $BBr_3$, and $BI_3$. These may be used singly or in combination of two or more thereof. Among them, it is preferable to use lithium halides (LiX (X represents a halogen)).

(Mixing Step)

The method for mixing the raw materials of the sulfur-containing compound is not particularly limited. For example, a paint shaker, a ball mill, a bead mill, or a homogenizer may be used for mixing.

However, when the mechanical milling method and the melt quenching method are employed for mixing and the mixture is subjected to excessive kinetic energy, a part or all of the sulfur or sulfur compound added in the stage of the mixing step is vaporized. Therefore, it is preferable not to employ the mechanical milling method and the melt quenching method.

The raw materials such as lithium sulfide and phosphorus sulfide are extremely unstable in the atmosphere, and are decomposed by reacting with moisture to generate a sulfide gas or to oxidize. Therefore, it is preferable to perform the mixing step in a glove box or the like replaced with an inert gas atmosphere.

The raw material mixture obtained in the mixing step may be subjected to treatments such as drying, stirring, washing, sieving, and classification, if necessary, and then may be supplied to a calcination step.

(Calcination Step)

In the present step, the raw material mixture obtained in the mixing step is preferably calcined so as to be heated to 500° C. or higher (product temperature) while allowing a hydrogen sulfide gas ($H_2S$) to flow.

The calcination step may be a one-stage calcination step, or a two-stage calcination step as in Examples described later. Here, the calcination temperature at this time means the product temperature, and can be measured, for example, by inserting a thermocouple into the calcining product.

The container in which the raw materials are put at the time of calcining may be a container with a lid or a container without a lid. The container is preferably a container that allows gas inside and outside the container to flow, but not an airtight container such as a sealed tube. Examples of the container in which the raw materials are put at the time of calcining may include containers made of materials such as carbon, alumina, zirconia, and SiC.

The calcination temperature, that is, the highest achieving temperature of the product temperature at the time of calcining is preferably 500° C. or higher, more preferably 600° C. or higher, and even more preferably 700° C. or higher, from the viewpoint of preparing a novel crystal phase.

The calcination time, that is, the time for heating to a temperature higher than 500° C., may be such that the solid phase reaction or the crystallization reaction of the mixture sufficiently proceeds, and is preferably appropriately adjusted by considering the mixing state of the mixture or the calcination temperature. Typically, the calcination time is preferably 1 hour or more and 10 hours or less, and more preferably 2 hours or more or 6 hours or less.

The temperature-rise rate at the time of calcining is preferably 300° C./hr or less from the viewpoint of reducing reaction unevenness, and considering the viewpoint of maintaining calcining efficiency, it is more preferably 50° C./hr or more or 250° C./hr or less, and even more preferably 100° C./hr or more or 200° C./hr or less.

After the calcination, the calcined product may be crushed and pulverized if necessary, and classified if necessary. For example, the calcined product is preferably crushed and pulverized using a pulverizer such as a planetary ball mill, a vibration mill, or a rolling mill, or a kneader or the like.

<Present Solid Electrolyte>

The solid electrolyte according to an example of the embodiment of the present disclosure (referred to as "present solid electrolyte") may be one containing the present sulfur-containing compound. That is, the present solid electrolyte may be composed of only the present sulfur-containing compound, or may be a composition containing the present sulfur-containing compound.

Here, the "solid electrolyte" refers to a solid body having Li ionic conductivity that can be used as a substitute for an electrolyte solution or a separator, for example, in designing a battery, but not a film (so-called SEI (Solid Electrolyte Interphase)) generated at the electrode material interface in an initial charge and discharge reaction or the like after producing a battery.

From the viewpoint of enjoying the effect of the present sulfur-containing compound, that is, the effect of suppressing the generation of hydrogen sulfide, the present solid electrolyte preferably contains the present sulfur-containing compound as a main component.

When the present solid electrolyte contains the present sulfur-containing compound as a main component, that is, when the present solid electrolyte contains the novel crystal phase in the present disclosure as a main phase, the generation of hydrogen sulfide can be effectively suppressed compared with the case of containing a crystal phase having, for example, an argyrodite-type structure as a main phase.

Here, when the present solid electrolyte contains the present sulfur-containing compound as a main component, the ratio of the present sulfur-containing compound to the present solid electrolyte may be, for example, 10% by mass or more, may be 20% by mass or more, or may be 50% by mass or more. In the present disclosure, the ratio is preferably 60% by mass or more, more preferably 80% by mass or more, even more preferably 90% by mass or more, and still more preferably 99% by mass or more (including 100% by mass).

The form of the present solid electrolyte may be, for example, particles or powder.

The present solid electrolyte may contain a phase different from the novel crystal phase in the present disclosure (also referred to as "different phase") or a compound different therefrom (also referred to as "different compound"). Here, the different phase or the different compound may not be contained.

Examples of the different phase or the different compound may include a crystal phase or a compound having a crystal phase of an argyrodite-type structure ($Li_7P_4S_6X_1$), $Li_3PS_4$, $LiX_2$ (for example, $Li_4Cl_4Br_4$), and LiX.

Whether or not the present solid electrolyte contains a crystal phase having an argyrodite-type structure can be confirmed by XRD measurement or the like.

That is, in an X-ray diffraction pattern measured by an X-ray diffraction apparatus (XRD) using CuKα1 rays, the crystal phase having an argyrodite-type structure has characteristic peaks at $2\theta=15.34°\pm1.00°$, $17.74°\pm1.00°$, $25.19°\pm1.00°$, $29.62°\pm1.00°$, $30.97°\pm1.00°$, $44.37°\pm1.00°$, $47.22°\pm1.00°$, and $51.70°\pm1.00°$. Also, the crystal phase has characteristic peaks at, for example, $2\theta=54.26°\pm1.00°$, $58.35°\pm1.00°$, $60.72°\pm1.00°$, $61.50°\pm1.00°$, $70.46°\pm1.00°$, and $72.61°\pm1.00°$.

On the other hand, the present solid electrolyte does not contain the crystal phase having an argyrodite-type structure means that the crystal phase having an argyrodite-type structure has no characteristic peaks.

(Particle Diameter)

The particle diameter when the form of the present solid electrolyte is particles will be described below.

The present solid electrolyte preferably has a $D_{50}$ (referred to "average particle diameter $(D_{50})$" or "$D_{50}$"), according to a volume-based particle size distribution obtained via measurement by a laser diffraction scattering-type particle size distribution measurement method, of 0.1 μm or more and 150 μm or less.

When the $D_{50}$ of the present solid electrolyte is 0.1 μm or more, an increase in the surface area of the whole powder composed of the present solid electrolyte can be suppressed, and the occurrence of troubles such as an increase in resistance and difficulty in mixing with active materials, can be suppressed. In addition, when the $D_{50}$ of the present solid electrolyte is 150 μm or less, the present solid electrolyte is easily entered into the gap or the like of other solid electrolytes used in combination with the present solid electrolyte. Thereby, the contact point and the contact area of the solid electrolytes are increased, and the ionic conductivity can be improved.

From such a viewpoint, the average particle diameter $(D_{50})$ of the present solid electrolyte is preferably, for example, 0.1 μm or more, more preferably 0.3 μm or more, and even more preferably 0.5 μm or more. In addition, the average particle diameter $(D_{50})$ of the present solid electrolyte is preferably, for example, 150 μm or less, more preferably 70 μm or less, and even more preferably 50 μm or less.

The average particle diameter $(D_{50})$ of the present solid electrolyte when the present solid electrolyte is added into the electrodes is preferably 1% or more and 100% or less of the average particle diameter $(D_{50})$ of the positive electrode active material or the average particle diameter $(D_{50})$ of the negative electrode active material, more preferably 3% or more or 50% or less thereof, and even more preferably 5% or more or 30% or less thereof.

When the average particle diameter $(D_{50})$ of the present solid electrolyte falls within the above range, the space of the positive electrode active material or the negative electrode active material (collectively referred to as "active material") can be filled without gaps, and the filling rate of the electrode can be increased.

(Method for Producing Present Solid Electrolyte)

The present solid electrolyte can be produced by adjusting the compositions of the raw materials in the method for producing the sulfur-containing compound.

It can also be produced by mixing the sulfur-containing compound with other compounds.

(Hydrogen Sulfide Generation Amount)

After placing 50 mg of the present solid electrolyte in a sealed bag in a glove box and sealing the same, the sealed bag is opened in a thermo-hygrostat (−30° C. dew point atmosphere and room temperature (25° C.)). The amount of hydrogen sulfide generated in 60 minutes after the sulfide particles are placed in the sealed bag and sealed is measured using a hydrogen sulfide sensor. The amount of hydrogen sulfide generated may be, for example, 0.4 cm$^3$/g or less, particularly 0.25 cm$^3$/g or less, particularly 0.20 cm$^3$/g or less, and particularly 0.15 cm$^3$/g or less.

(Application of Present Solid Electrolyte)

The present solid electrolyte can be used as a material constituting a solid electrolyte layer, a positive electrode layer, or a negative electrode layer. Therefore, the present solid electrolyte can be used in, for example, a battery having a solid electrolyte layer, that is, an all-solid battery. Specifically, it can be used in a lithium all-solid battery. The lithium all-solid battery may be a primary battery or a secondary battery.

<Present Battery>

The battery according to an example of the embodiment of the present disclosure (referred to as "present battery") is a battery having a positive electrode layer, a negative electrode layer, and a solid electrolyte layer between the positive electrode layer and the negative electrode layer, and containing the present solid electrolyte. In the present battery, for example, at least one of the negative electrode layer and the solid electrolyte layer preferably contains the present solid electrolyte. The present battery is a so-called all-solid battery.

Examples of the shape of the present battery may include a laminate-type, a cylindrical-type, and a square-type.

The present solid electrolyte is excellent in moisture resistance, and has less degradation of the characteristics even when handled in dry air. Therefore, the operation of assembling the all-solid battery can be performed even in, for example, a dry room or the like.

Here, the solid electrolyte layer can be produced by, for example, a method in which a slurry composed of the present solid electrolyte, a binder, and a solvent is dropped on a substrate, and rubbed and cut with a doctor blade or the like, a method of cutting with an air knife after contacting the substrate with the slurry, or a method in which a coating film is formed by a screen printing method or the like, and the solvent is then removed through heating and drying processes. Alternatively, the layer can also be produced in such a manner that the powdered present solid electrolyte is pressed by a press or the like to produce a pressed powder, and then the pressed powder is appropriately processed.

In the solid electrolyte layer containing the present solid electrolyte, from the viewpoint of enhancing the lithium ionic conductivity, the porosity is preferably 50% or less, more preferably 30% or less, and even more preferably 20% or less.

The porosity of the solid electrolyte layer can be adjusted by, for example, a press pressure used when the powdered present solid electrolyte is formed into a pressed powder. In the present disclosure, the press pressure is preferably, for example, 20 MPa or more.

Here, the porosity can be calculated from true density and apparent density of the solid electrolyte layer, which are obtained by a liquid-phase method (Archimedes method), according to a relational formula described below.

Porosity (%)=(true density−apparent density)÷true density×100

The thickness of the solid electrolyte layer is typically preferably 5 μm or more and 300 μm or less, and more preferably 10 μm or more or 100 μm or less, from the viewpoint of the balance between short circuit prevention and volume capacity density.

The present solid electrolyte can also be used as a solid electrolyte layer obtained by mixing the present solid electrolyte and other solid electrolytes. The present solid electrolyte can be used in combination with any of amorphous (glass), glass ceramics, and crystalline materials. Specific examples of the sulfide solid electrolyte may include $Li_2S$—$P_2S_5$ series, $Li_4P_2S_6$, and $Li_7P_3S_{11}$. The solid electrolyte to be combined may be a non-sulfide, for example, an oxide-based solid electrolyte.

As a positive electrode material constituting the positive electrode layer, a positive electrode material that is used as a positive electrode active material for a lithium ion battery can be appropriately used. For example, a positive electrode active material containing lithium, specifically, a spinel-type lithium transition metal oxide and a lithium metal oxide having a layered structure can be cited. By using a high-voltage system positive electrode material, the energy density can be improved.

As for the positive electrode material, in addition to the positive electrode active material, a conductive material or other materials, for example, a solid electrolyte may be contained therein, or the present solid electrolyte may be used as the solid electrolyte.

As a negative electrode material constituting the negative electrode layer, a negative electrode material that is used as a negative electrode active material for a lithium ion battery can be appropriately used. Since the present solid electrolyte is electrochemically stable, a carbon-based material such as graphite, artificial graphite, natural graphite, or non-graphitizing carbon (hard carbon), all of which are charged and discharged at a low electric potential (about 0.1 V vs. Li$^+$/Li) that is of a lithium metal or equal to a lithium metal, can also be used. For this reason, the energy density of the all-solid battery can be greatly improved. In addition, silicon or tin promising as a high capacity material can also be used as the active substance. In a battery using a general electrolytic solution, the electrolytic solution is reacted with the active material during charging and discharging, and the surface of the active material is corroded, so that the battery characteristics are remarkably deteriorated. On the other hand, when the present solid electrolyte is used in place of the electrolyte solution and silicon or tin is used as the negative electrode active material, the above corrosion reaction does not occur, and the durability of the battery can be improved.

As for the negative electrode material, in addition to the negative electrode active material, a conductive material or other materials, for example, a solid electrolyte may be contained therein, or the present solid electrolyte may be used as the solid electrolyte.

Explanation of Terms

In the present disclosure, in the case of being expressed as "α or more" or "α≤" (α is an arbitrary number), the term includes the intention of "preferably larger than α"; and in the case of being expressed as "β or less" or "β≥" (β is an arbitrary number), the term includes the intention of "preferably smaller than β".

EXAMPLES

The present disclosure will be further described in detail with reference to Examples and Comparative Examples below.

Example 1

For preparing a novel crystal phase in the present disclosure, lithium sulfide ($Li_2S$) powder, diphosphorus pentasulfide ($P_2S_5$) powder, lithium chloride (LiCl) powder, and lithium bromide (LiBr) powder were respectively weighed such that the composition was $Li_{5.2}PS_{4.2}Cl_{0.9}Br_{0.9}$ and the total amount was 5 g, and heptane was added thereto. The raw materials were pulverized and mixed using a wet-type pulverizing and mixing ball mill for 10 hours, and the mixture was vacuum-dried using a vacuum dryer to obtain a mixed powder.

The resulting mixed powder was then filled up to 80% by volume in a carbon container (40 mm×30 mm×20 mm, non-airtight). This was heated at 300° C. (product temperature) for 4 hours while allowing a hydrogen sulfide gas ($H_2S$) to flow at 1.0 l/min in a tubular electric furnace, and then further heated at 500° C. (product temperature) for 4 hours. The temperature rise and fall rate was set to 200° C./hr. Subsequently, the sample was roughly pulverized in a mortar, and heptane was added thereto. The mixture was pulverized and mixed using a wet-type pulverizing and mixing ball mill for 2 hours, and was sieved using a horizontal swivel sieve having an opening of 53 µm, thereby obtaining a powdery sulfur-containing compound (sample).

Here, the weighing, mixing, setting in the electric furnace, taking out from the electric furnace, pulverizing, and sieving were all performed in a glove box replaced with a sufficiently dried Ar gas (dew point of −60° C. or less), to obtain a powdery sulfur-containing compound (sample) represented by a compositional formula of $Li_{5.2}PS_{4.2}Cl_{0.9}Br_{0.9}$.

Example 2

A powdery sulfur-containing compound (sample) was obtained in the same manner as in Example 1 except that the raw materials were prepared such that the compositional formula was $Li_{5.0}PS_{4.0}Cl_{1.0}Br_{1.0}$.

Example 3

A powdery sulfur-containing compound (sample) was obtained in the same manner as in Example 1 except that the raw materials were prepared such that the compositional formula was $Li_{5.2}PS_{4.2}Cl_{1.35}Br_{0.45}$.

Example 4

A powdery sulfur-containing compound (sample) was obtained in the same manner as in Example 1 except that the raw materials were prepared such that the compositional formula was $Li_{5.2}PS_{4.2}Cl_{0.45}Br_{1.35}$.

Comparative Example 1

A powdery sulfur-containing compound (sample) was obtained in the same manner as in Example 1 except that the raw materials were prepared such that the compositional formula was $Li_{5.4}PS_{4.4}Cl_{0.8}Br_{0.8}$.

<X-Ray Diffraction Measurement>

The sulfur-containing compound (sample) obtained in each of Examples 1 to 4 and Comparative Example 1 was analyzed by an X-ray diffraction method (XRD, Cu ray source) to obtain an X-ray diffraction pattern, and the peak intensity (cps) at each position was measured. The measurement was performed using an XRD apparatus "Smart Lab" manufactured by Rigaku Corporation in atmospheric non-exposure, under the conditions of a scanning axis of 2θ/θ, a scanning range of 10° or more and 140° or less, a step width of 0.01°, and a scanning speed of 1°/min. The X-ray source was a CuKα1 ray using a Johansson-type crystal, and the measurement was performed by a one-dimensional detector. The results are shown in FIG. 1.

The data of PDF number 00-034-0688 was used for the identification of the peaks derived from the argyrodite-type crystal structure.

<X-Ray Rietveld Analysis>

The Rietveld analysis was performed by using the XRD data measured under the above conditions with analysis software "RIETAN-FP v2.8.3". At this time, the indicator of the validity was defined as follows: Rwp<10% and S<2.0.

<Measurement of Generation Amount of Hydrogen Sulfide ($H_2S$)>

The sulfur-containing compound (sample) obtained in each of Examples 1 to 4 and Comparative Example 1 was weighed 50 mg each in a glove box replaced with a sufficiently dried Ar gas (dew point of −60° C. or less), and was put in a bag sealed with a laminate film. Thereafter, a separable flask made of glass having a capacity of 1,500 cm$^3$ was placed in a thermo-hygrostat maintained at room temperature (25° C.) in a −30° C. dew point atmosphere adjusted by mixing dry air and the atmosphere, and was left to stand till the inside of the separable flask became the same as the environment in the thermo-hygrostat. Then, the sealed bag containing the sample was opened in the thermo-hygrostat, and the sample was quickly placed in the separable flask. The concentration of hydrogen sulfide generated in 60 minutes just after placing the sample in the separable flask and sealing the flask was measured using a hydrogen sulfide sensor (GX-2009, manufactured by Riken Keiki Co., Ltd.).

Then, the volume of the hydrogen sulfide was calculated from the concentration of the hydrogen sulfide after the lapse of 60 minutes to determine a generation amount of the hydrogen sulfide after the lapse of 60 minutes. The results are shown in Table 1.

<Production and Evaluation of All-Solid Battery Cell>

(Materials)

A $LiNi_{0.03}Co_{0.03}Mn_{0.33}O_2$ (NCM) powder ($D_{50}$=6.7 µm) which was a layered compound was used as the positive electrode active material, silicon ($D_{50}$=3.0 µm) was used as the negative electrode active material, and the sample obtained in Example 1 was used as the solid electrolyte.

(Preparation of Positive Electrode Material and Negative Electrode Material)

The positive electrode material was prepared by mixing the positive electrode active material, the solid electrolyte, and a conductive additive (acetylene black) powder in a mortar at a mass ratio of 60:37:3, and uniaxially press-molded at 20 MPa to obtain a positive electrode material pellet.

The negative electrode material was prepared by mixing the silicon, the solid electrolyte, and carbon as a conductive additive in a mortar at a mass ratio of 47.5:47.5:5.

(Production of All-Solid Battery Cell)

The lower opening part of a cylinder (opening diameter of 10.5 mm, height of 18 mm) made of polypropylene, in which the upper and lower sides were opened, was closed with a positive electrode current collector (made of SUS), and the positive electrode material pellet was placed on the positive electrode current collector. The sulfur-containing compound (sample) obtained in Example 1 was placed thereon, and uniaxially pressed at 180 MPa to form a positive electrode layer and a solid electrolyte layer. Then, the negative electrode material was placed thereon, and the cylinder was closed with a negative electrode current collector (made of SUS); and the system was uniaxially molded at 550 MPa to produce an all-solid battery cell having a three-layered structure of the positive electrode layer having a thickness of about 100 μm, the solid electrolyte layer having a thickness of about 300 μm, and the negative electrode layer having a thickness of about 20 μm. At this time, the production of the all-solid battery cell was performed in a glove box replaced with an argon gas having a dew point temperature of −60° C.

Then, using the all-solid battery cell, the battery characteristics (initial charge and discharge capacity) were evaluated as follows.

The battery characteristics were evaluated by placing the all-solid battery cell into an environmental tester maintained at 25° C. and connecting with a charge-discharge measurement apparatus. In charging and discharging the battery, 3 mA was defined as 1 C. The charge was performed up to 4.5 V at 0.1 C by the CC-CV mode to obtain an initial charge capacity. The discharge was performed up to 2.5 V at 0.1 C by the CC mode to obtain an initial discharge capacity.

Thereafter, the battery was charged in a 0.2 C constant current/constant potential up to 4.5 V, and was then discharged in a 5 C constant current down to 2.5 V to obtain a discharge capacity in 5 C. The ratio of the discharge capacity in 5 C was calculated when the discharge capacity in 0.1 C was defined as 100%, thereby obtaining a charge and discharge efficiency (%) and rate characteristics (5 C/0.1 C (%)).

Further, instead of the sulfur-containing compound (sample) obtained in Example 1, the sulfur-containing compound (sample) obtained in each of Examples 2 to 4 and Comparative Example 1 was used to produce an all-solid battery cell in the same manner as above, and the battery characteristics were evaluated in the same manner as above. The results are shown in Table 1.

Comparative Example 2

A powdery sulfur-containing compound (sample) was obtained in the same manner as in Example 5 except that the annealing treatment was not performed.

<Measurement of Generation Amount of Hydrogen Sulfide ($H_2S$)>

Using the sulfur-containing compound (sample) obtained in each of Example 5 and Comparative Example 2, the amount of hydrogen sulfide generated during 60 minutes was measured by the same method as described above. The results are shown in FIG. 2.

<X-Ray Diffraction Measurement>

The sulfur-containing compound (sample) obtained in each of Example 5 and Comparative Example 2 was analyzed by the X-ray diffraction method (XRD, Cu ray source) in the same manner as described above. Here, the measurement was performed on a mixture in which paraffin was mixed with the sample. The results are shown in FIG. 3.

Example 2-1

A sulfur-containing compound (sample) was obtained in the same manner as in Example 1 except that the raw materials were prepared such that the compositional formula was $Li_{5.0}PS_{4.0}Cl_{1.0}Br_{1.0}$, and the calcination temperature was set to 550° C.

Example 2-2

A sulfur-containing compound (sample) was obtained in the same manner as in Example 2-1 except that the calcination temperature was set to 500° C.

Example 6

A powdery sulfur-containing compound (sample) was obtained in the same manner as in Example 1 except that the raw materials were prepared such that the compositional formula was $Li_{5.0}PS_{4.0}Cl_{1.5}Br_{0.5}$, and the calcination temperature was set to 550° C.

Example 7

A powdery sulfur-containing compound (sample) was obtained in the same manner as in Example 6 except that the

TABLE 1

| | Composition | $H_2S$ generation amount ($cm^3/g$) | Initial charge capacity (mAh/g) | Initial discharge capacity (mAh/g) | Efficiency (%) | Rate characteristics 5 C/0.1 C (%) |
|---|---|---|---|---|---|---|
| Example 1 | $Li_{5.2}PS_{4.2}Cl_{0.8}Br_{0.8}$ | 0.2 | 264.4 | 173.4 | 65.6 | 20.8 |
| Example 2 | $Li_{5.0}PS_{4.0}Cl_{1.0}Br_{1.0}$ | 0.0 | 263.6 | 172.1 | 65.3 | 17.4 |
| Example 3 | $Li_{5.2}PS_{4.2}Cl_{1.35}Br_{0.45}$ | 0.2 | 270.1 | 174.0 | 64.4 | 19.7 |
| Example 4 | $Li_{5.2}PS_{4.2}Cl_{0.45}Br_{1.35}$ | 0.2 | — | — | — | — |
| Comparative Example 1 | $Li_{5.4}PS_{4.4}Cl_{0.8}Br_{0.8}$ | 0.4 | 248.2 | 175.0 | 70.5 | 18.2 |

Example 5

The powdery sulfur-containing compound (sample) obtained in Comparative Example 1 was subjected to an annealing treatment at 700° C. (for 4 hours) in an Ar atmosphere to obtain a powdery sulfur-containing compound (sample).

raw materials were prepared such that the compositional formula was $Li_{5.0}PS_{4.0}Cl_{0.5}Br_{1.5}$.

Example 8

A powdery sulfur-containing compound (sample) was obtained in the same manner as in Example 1 except that the raw materials were prepared such that the compositional formula was $Li_{4.6}PS_{4.0}Cl_{0.8}Br_{0.8}$, and the calcination temperature was set to 500° C.

Example 9

A powdery sulfur-containing compound (sample) was obtained in the same manner as in Example 8 except that the raw materials were prepared such that the compositional formula was $Li_{4.2}PS_{4.0}Cl_{0.6}Br_{0.6}$.

Example 10

A powdery sulfur-containing compound (sample) was obtained in the same manner as in Example 8 except that the raw materials were prepared such that the compositional formula was $Li_{3.8}PS_{4.0}Cl_{0.4}Br_{0.4}$ Example 11

A powdery sulfur-containing compound (sample) was obtained in the same manner as in Example 8 except that the raw materials were prepared such that the compositional formula was $Li_{3.4}PS_{4.0}Cl_{0.2}Br_{0.2}$.

Comparative Example 3

A powdery sulfur-containing compound (sample) was obtained in the same manner as in Example 6 except that the raw materials were prepared such that the compositional formula was $Li_{5.0}PS_{4.0}Cl_{2.0}$ <X-Ray Diffraction Measurement>

The sulfur-containing compound (sample) obtained in each of Example 2-1, Example 2-2, Examples 6 to 11, and Comparative Example 3 was analyzed by the X-ray diffraction method (XRD, Cu ray source) in the same manner as described above. The results are shown in FIG. 4 and FIG. 5.

<Measurement of Generation Amount of Hydrogen Sulfide ($H_2S$)>

Using the sulfur-containing compound (sample) obtained in each of Example 2-2 and Examples 8 to 11, the amount of hydrogen sulfide generated was measured by the same method as described above. The results are shown in Table 2.

TABLE 2

|  | Composition | $H_2S$ generation amount ($cm^3/g$) |
| --- | --- | --- |
| Example 2-2 | $Li_{5.0}PS_{4.0}Cl_{1.0}Br_{1.0}$ | 0.03 |
| Example 8 | $Li_{4.6}PS_{4.0}Cl_{0.8}Br_{0.8}$ | 0.07 |
| Example 9 | $Li_{4.2}PS_{4.0}Cl_{0.6}Br_{0.8}$ | 0.06 |
| Example 10 | $Li_{3.8}PS_{4.0}Cl_{0.4}Br_{0.4}$ | 0.05 |
| Example 11 | $Li_{3.4}PS_{4.0}Cl_{0.2}Br_{0.2}$ | 0.06 |

As a result of measuring the X-ray diffraction pattern with the X-ray diffraction apparatus (XRD), it can be confirmed that the sulfur-containing compound (sample) obtained in each of Examples 1 to 11, Example 2-1, and Example 2-2 had a peak at each position of $2\theta=21.3°\pm1.0°$, $27.8°\pm1.0°$, and $30.8°\pm0.5°$. These peaks were peaks belonging to the novel crystal phase in the present disclosure. It is found that the novel crystal phase having the above peaks was a normal trigonal crystal phase or a hexagonal crystal phase.

It is also found that the two peaks D and E present in a range of $2\theta=25.0°$ or more and $26.0°$ or less, as well as the three peaks G, H, and I present in a range of $2\theta=30.0°$ or more and $31.0°$ or less were peaks belonging to the novel crystal phase.

Further, it is found that the sulfur-containing compound (sample) obtained in each of Examples 1 to 11, Example 2-1, and Example 2-2 could effectively suppress the generation of a hydrogen sulfide gas.

It is also found that the sulfur-containing compound (sample) obtained in each of Examples 1 to 11, Example 2-1, and Example 2-2 could be suitably used as a solid electrolyte for an all-solid battery.

Here, as for the evaluation of the battery characteristics, only the results of the sulfur-containing compound (sample) obtained in each of Examples 1 to 3 are shown. However, it can be understood that the sulfur-containing compound (sample) obtained in each of Examples other than the above is similar to that in each of Examples 1 to 3 in terms of composition and crystal structure, and thus exhibits similar battery characteristics.

The invention claimed is:

1. A sulfur-containing compound, comprising a lithium (Li) element, a phosphorus (P) element, a sulfur (S) element, and a halogen (X) element, and having a peak at each position of $2\theta=21.3°\pm1.0°$, $27.8°\pm1.0°$, and $30.8°\pm0.5°$ and at least two peaks, referred to as peak D and peak E, respectively in a range of $2\theta=25°$ or more and $2\theta=26.0°$ or less, in an X-ray diffraction pattern measured by an X-ray diffraction apparatus (XRD) using CuKα1 rays,
wherein the sulfur-containing compound is represented by a general formula of $Li_aPS_bX_c$, wherein X is at least one of F, Cl, Br, and I, a is in a range of 3.0 or more and 6.0 or less, b is in a range of 3.5 or more and 4.8 or less, and c is in a range of 0.1 or more and 3.0 or less.

2. The sulfur-containing compound according to claim 1, having at least three peaks, referred to as peak G, peak H, and peak I, respectively, in a range of $2\theta=30.0°$ or more and $31.0°$ or less, in an X-ray diffraction pattern measured by an X-ray diffraction apparatus (XRD) using CuKα1 rays.

3. The sulfur-containing compound according to claim 1, comprising a chlorine (Cl) element and a bromine (Br) element as the halogen (X) element.

4. A solid electrolyte, comprising the sulfur-containing compound according to claim 1.

5. The solid electrolyte according to claim 4, comprising the sulfur-containing compound as a main component.

6. A battery, having a positive electrode layer, a negative electrode layer, and a solid electrolyte layer between the positive electrode layer and the negative electrode layer, wherein the battery comprises the solid electrolyte according to claim 4.

7. The sulfur-containing compound according to claim 2, comprising a chlorine (Cl) element and a bromine (Br) element as the halogen (X) element.

8. A solid electrolyte, comprising the sulfur-containing compound according to claim 2.

9. The solid electrolyte according to claim 8, comprising the sulfur-containing compound as a main component.

10. A battery, having a positive electrode layer, a negative electrode layer, and a solid electrolyte layer between the positive electrode layer and the negative electrode layer, wherein the battery comprises the solid electrolyte according to claim 8.

11. A solid electrolyte, comprising the sulfur-containing compound according to claim 3.

12. The solid electrolyte according to claim 11, comprising the sulfur-containing compound as a main component.

13. A battery, having a positive electrode layer, a negative electrode layer, and a solid electrolyte layer between the positive electrode layer and the negative electrode layer, wherein the battery comprises the solid electrolyte according to claim 11.

\* \* \* \* \*